(12) United States Patent
Chambers

(10) Patent No.: US 8,134,935 B2
(45) Date of Patent: Mar. 13, 2012

(54) TRANSACTION TOPOLOGY DISCOVERY USING CONSTRAINTS

(75) Inventor: Graeme Stanley Chambers, Dianella (AU)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/470,852

(22) Filed: May 22, 2009

(65) Prior Publication Data

US 2010/0296411 A1    Nov. 25, 2010

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. ......... 370/254; 370/238; 370/252; 709/226
(58) Field of Classification Search .......... 370/218–237, 370/252–254, 329–352; 709/218–226, 238–249
See application file for complete search history.

(56) References Cited

U.S. PATENT DOCUMENTS

| 5,307,465 | A  | * | 4/1994  | Iki ................................ 709/221 |
| 6,643,269 | B1 |   | 11/2003 | Fan et al. |
| 6,847,970 | B2 | * | 1/2005  | Keller et al. .......................... 1/1 |
| 6,925,061 | B2 | * | 8/2005  | Lee et al. ....................... 370/238 |
| 7,096,459 | B2 | * | 8/2006  | Keller et al. .................. 717/124 |
| 7,240,325 | B2 | * | 7/2007  | Keller .............................. 717/104 |
| 7,257,081 | B2 | * | 8/2007  | Rajan et al. .................... 370/231 |
| 7,319,700 | B1 |   | 1/2008  | Kompella |
| 7,334,222 | B2 | * | 2/2008  | Keller ............................ 717/135 |
| 7,505,872 | B2 | * | 3/2009  | Keller et al. .................. 702/186 |
| 7,644,161 | B1 | * | 1/2010  | Graupner et al. ............. 709/226 |
| 7,773,559 | B2 | * | 8/2010  | Chen et al. ..................... 370/329 |
| 7,864,751 | B2 | * | 1/2011  | Greenberg ..................... 370/351 |
| 7,903,573 | B2 | * | 3/2011  | Singer et al. .................. 370/252 |
| 2003/0179227 | A1 | * | 9/2003 | Ahmad et al. ................. 345/736 |

* cited by examiner

*Primary Examiner* — Man Phan
(74) *Attorney, Agent, or Firm* — Yee & Associates, P.C.; Jeffrey S. LaBaw

(57) ABSTRACT

Determining a transaction topology of a network through generating and solving an adjacency matrix. A transaction is performed in a network and a list of statistics generated by the transaction is collected. The statistics provide a calculation of the number of inbound transactions and the number of outbound transactions for each node. A matrix structure is composed with the statistic. Constraints are applied to the matrix structure and a solution set of topology structures for the network is determined. The solution set of topology structures may be refined as needed with application of additional constraints.

17 Claims, 12 Drawing Sheets

902 {
```
Let N = number of nodes for which inbound and outbound statistics have been collected
Let A = the matrix of integer variables, size ( N, N )
Let C = the set of constraints
Let i,j,k = integer >= 0
```

904 {
```
Input
Inbound[k]    The list of inbound events for each node k
Outbound[k]   The list of outbound events for each node k
Threshold     The limit on clock skew between any two nodes
```

906 {
```
for i = 1 to N do
   for j = 1 to N do
      Add constraint 702
      C = C + { A[i, j] >= 0 }
   endfor
   Add constraint 704
   C = C + { A[1, i]) == 0 }
endfor
```

908 {
```
for i = 1 to N do
   Add constraint 706
   C = C + { Sum(A[1..N, i] ) == Inbound[k] }
   Add constraint 708
   C = C + { Sum(A[i, 1..N] ) == Outbound[k] }
   Add constraint 710
   C = C + { Sum(A[1..N, i] ) * Sum(A[i, 1..N] ) == Inbound[k] * Outbound[k] }
endfor
```

910 {
```
if timing information is recorded then
   for i 1 to N do
      for j = 1 to N do
         Retain the events which are within a time threshold
         TemporalLimit = Intersection( |Inbound[j] -Outbound[i] | < threshold )
         Add a constraint for the largest subset of temporally limited events
         C = C + { A[i, j] <= Max(TemporalLimit) }
      endfor
   endfor
else
   for i = 1 to N do
      for j = 1 to N do
         Add a constraint for the largest of inbound or outbound
         C = C + { A[i, j] <= Max(Inbound[j], Outbound[i] ) }
      endfor
   endfor
endif
```

912 {
```
Integer Programming Solver s
Let solutions = s.Solve(C)
return solutions
```

|  | WS | APS_A | APS_B | DB_A | DB_B | OUTBOUND TALLY |
|---|---|---|---|---|---|---|
| WS | 0 | 1 | 0 | 0 | 0 | 1 |
| APS_A | 1 | 0 | 1 | 0 | 0 | 2 |
| APS_B | 0 | 1 | 0 | 1 | 1 | 3 |
| DB_A | 0 | 0 | 1 | 0 | 0 | 1 |
| DB_B | 0 | 0 | 0 | 0 | 0 | 0 |
| INBOUND TALLY | 1 | 2 | 3 | 1 | 1 | |

|  | DB_A | APS_A | APS_B | WS | DB_B | OUTBOUND TALLY |
|---|---|---|---|---|---|---|
| DB_A | 0 | 0 | 1 | 0 | 0 | 1 |
| APS_A | 1 | 0 | 1 | 0 | 0 | 2 |
| APS_B | 0 | 1 | 0 | 1 | 1 | 3 |
| WS | 0 | 1 | 0 | 0 | 0 | 1 |
| DB_B | 0 | 0 | 0 | 0 | 0 | 0 |
| INBOUND TALLY | 1 | 2 | 3 | 1 | 1 | |

*FIG. 11B*

TRANSACTION TOPOLOGY DISCOVERY USING CONSTRAINTS

BACKGROUND

1. Technical Field

This disclosure relates generally to network flow in a data processing transactional environment and more specifically to determining a transaction topology of a network through the application of constraints.

2. Description of the Related Art

Monitoring the processing of transactions within a network structure may provide information about the components in the network and the overall efficiency of the network. For example, the information may identify bottlenecks or blockages in a particular transaction flow that cause one or more components or applications in the system to process slowly or inefficiently. Identifying these problem areas may allow solutions for optimizing transaction flow to be determined.

One way to track a particular message or event that may be part of a transaction processed in a network is to specifically identify the destination of a message. For example, a message may need to be sent between a point A and a point B in a network. The transaction that may potentially occur between point A and point B must be specifically defined or declared. The history of the network may be referenced at some later point in time to determine whether the transaction actually occurred.

Another technique to track the processing of a particular event in a network may involve maintaining a state or context that relates the messages in a network. For example, a value or identifier may be attached to messages that are used in a transaction in a system. The components having the same or matching identifiers are determined to interact with or be part of the network for the particular transaction.

BRIEF SUMMARY

The disclosure describes a new approach to determining a topology structure of a transaction. A number of respective inbound and outbound transactions or messages to and from each component in a system network may be automatically tallied. A matrix is formed from the tallying. Solutions to the matrix may be automatically generated to represent possible topologies of the network. The solutions may be refined manually or through an interactive process by an application of additional constraints.

According to one embodiment, a computer implemented method of determining a topology of a transaction in a network is provided. The method includes generating statistics of a transaction processed by a network. The network may comprise a plurality of nodes or components. The method determines a data structure that is mathematical and is created from the statistics generated in processing the transaction. A number of constraints may be applied to the mathematical data structure to calculate a solution for the mathematical data structure.

According to one embodiment, a computer program product comprising a recordable medium tangibly embodying executable program code in a memory includes computer executable program code collecting and reporting on statistics of a transaction processed by a network, the network comprising a plurality of nodes; computer executable program code determining a data structure that is mathematical, the mathematical data structure being created from the reported statistics generated in processing the transaction; computer executable program code applying a number of constraints to the determined mathematical data structure; computer executable program code calculating all possible solutions for the mathematical data structure; and computer executable program code discovering a topology based on the calculated solution.

According to one embodiment, an apparatus that discovers a topology for a transaction is provided. The apparatus comprises means for generating a data structure that is mathematical with statistics tallied from processing a transaction through a network; means for applying a number of constraints to the generated mathematical data structure; means for calculating a solution for the mathematical data structure using the constraints and the tallied statistics; and means for determining a topology based on the calculated solution.

The embodiments of the disclosed processes and systems provide the advantage of determining the interrelationships or hierarchy of components that may be invoked in a transaction in a network without having to explicitly mark or identify each transaction with a signature or other identifier to determine the source or the destination of the transaction.

The embodiments of the disclosed processes and systems may also advantageously include the ability to further refine the set of topologies that may be generated by manual introduction of additional constraints and thereby increase the accuracy of the results.

Embodiments of the disclosed processes and systems may further provide the advantage of determining the interrelationships or hierarchy of components offline or subsequent to processing a transaction in a network. This is distinct from current technologies that may require online or in-process correlation of messages being processed by components.

The embodiments of the disclosed processes and systems may also advantageously include the ability to incorporate or augment existing technologies that use different transaction tracking techniques. For example, an existing technology may not be able to determine a complete topology structure or all the components in an entire structure. Therefore, the existing technology may work in conjunction with disclosed embodiments to provide a complete topology. These and other advantages will be more clearly understood from the detailed description taken in conjunction with the accompanying drawings and claims.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 9 depicts exemplary pseudocode that illustrates a functional implementation according to an embodiment of the disclosure;

FIGS. 11A and 11B illustrate two exemplary matrix solutions for a transaction.

DETAILED DESCRIPTION

Figure 1:
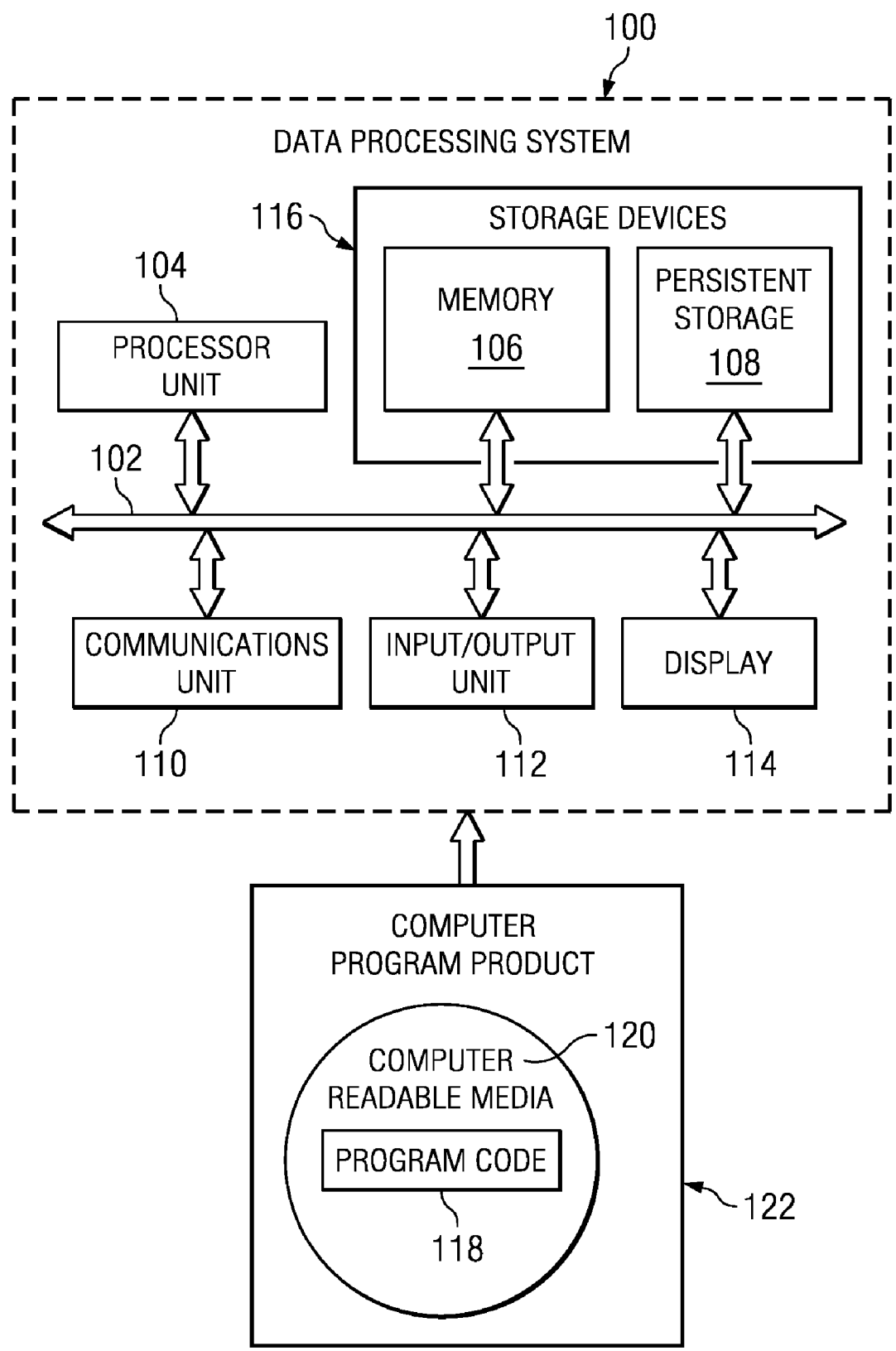
FIG. 1 is a block diagram of an exemplary software environment that may be operable for various embodiments of the disclosure.

Although an illustrative implementation of one or more embodiments are provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In embodiments of this disclosure, solutions to a mathematical matrix describe possible topologies that may represent a transaction performed in a network or enterprise. A transaction is executed in a network. The number of inbound and outbound messages used for the transaction at each node or component in the network is automatically tallied. A list of statistics may be generated and collected into a matrix structure. Mathematical constraints are applied to refine the matrix. The matrix is solved using the constraints to determine the possible layouts or topologies. The number of possible topologies may be further refined by the addition of further constraints by a user.

In embodiments of this disclosure, the network may be comprised of a number of components or nodes within an area network. The area network may be a local type of network, such as a local area network (LAN), a cluster area network (CAN), a server area network (SAN), or other type of local area network recognized by one skilled in the art. The area network may also be a wide area network (WAN) such as the Internet, a metropolitan area network (MAN), or other type of wide area network recognized by one skilled in the art. The area network may be wired or wireless.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
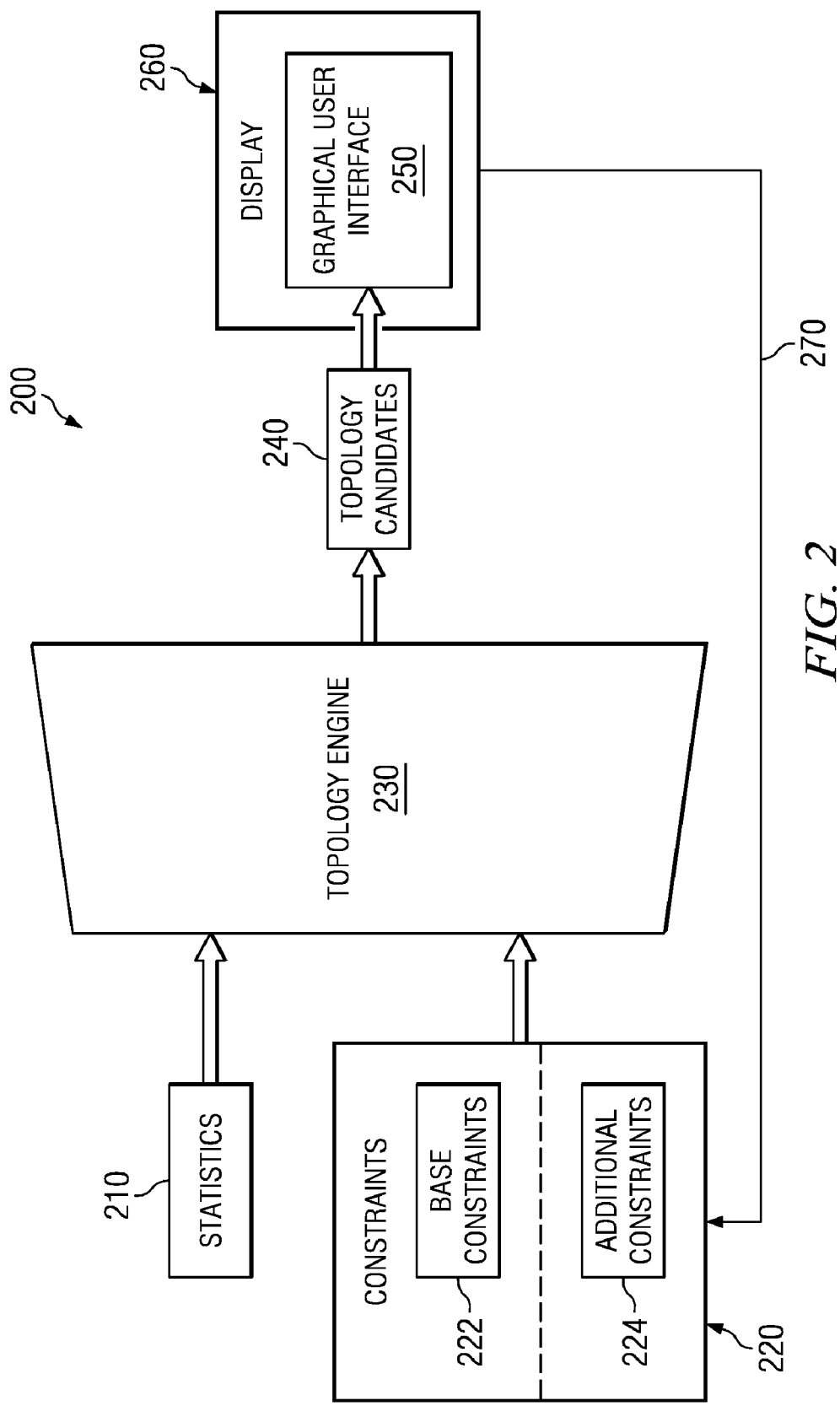
FIG. 2 illustrates a top level flow diagram according to one embodiment of the disclosure.

FIG. 2 is a schematic diagram that illustrates a top level operational flow 200 of one embodiment of the disclosure. A transaction may be run in a network that may be comprised of a number of machines or components that may be involved in the transaction. A transaction may be considered to be a set of related operations that achieves a task. The components that participate in the running of the transaction may generate information or statistics that are collected from each participating component. The statistics generated by each component may be stored by the component or machine or may be collected and stored in a separate entity in the network. The statistics 210 may include a number of messages or events that are input to or output from the components. The statistics may also include a record of time that each event or message was processed at the respective component in the network. It must be noted that only the time of the local component is needed. The time of a remote component is not required. The statistics 210 may be input to topology engine 230.

A set of constraints 220 may be determined as inputs to topology engine 230. Constraints 220 represent mathematical requirements. Constraints 220 may include a base set of constraints. The base constraints 222 represent the minimum set of constraints that must be input to the topology engine 230 to enable operations. Additional constraints 224 may be added as inputs to the topology engine 230 to enable a more accurate output from the topology engine 230. The additional constraints 224 may be added as initial inputs with the base constraints. Additional constraints 224 may also be added between an iterative processing by the topology engine 230.

Topology engine 230 processes inputs to determine the interrelationships of components in a network transaction. The topology engine 230 may include an application programming interface that receives information, such as a set of statistics 210 and constraints 220, for a particular transaction and translates the information to a format that may be required by the topology engine 230 for processing. Topology engine 230 mathematically processes the statistics 210 and the constraints 220 and outputs a number of topology candidates 240. One or more topology candidates 240 may be generated by the topology engine 230 processing. The topology candidates 240 may be stored in a database or some other storage means for later use. In an embodiment, topology candidates 240 may be output to a graphical user interface 250 of display 260. A graphical user interface 250 of display 260 may display the components used in the transactions and the possible existing interconnections among all the nodes.

The number of topology candidates 240 may be further refined for increased accuracy through an iterative processing of results that may be generated by topology engine 230. For example, the topology candidates 240 may be modified and returned to the topology engine 230 by a return path 270 for additional processing. Return path 270 is not intended to represent an actual physical structure. Rather, return path 270 is meant to illustrate that there may be computer program code implemented to perform an iteration of the processing of topology engine 230 after the topology candidates 240 are generated. Additional constraints 224 may be added to topology candidates that are modified prior to further processing by the topology engine 230. The additional processing by topology engine 230 may result in a decreased number of topology candidate 240 outputs. The additional processing may also result in more accurate candidate topologies being generated. The number of iterations of the topology engine may be pre-determined or may vary depending on the requirements of a particular enterprise.

Figure 3:
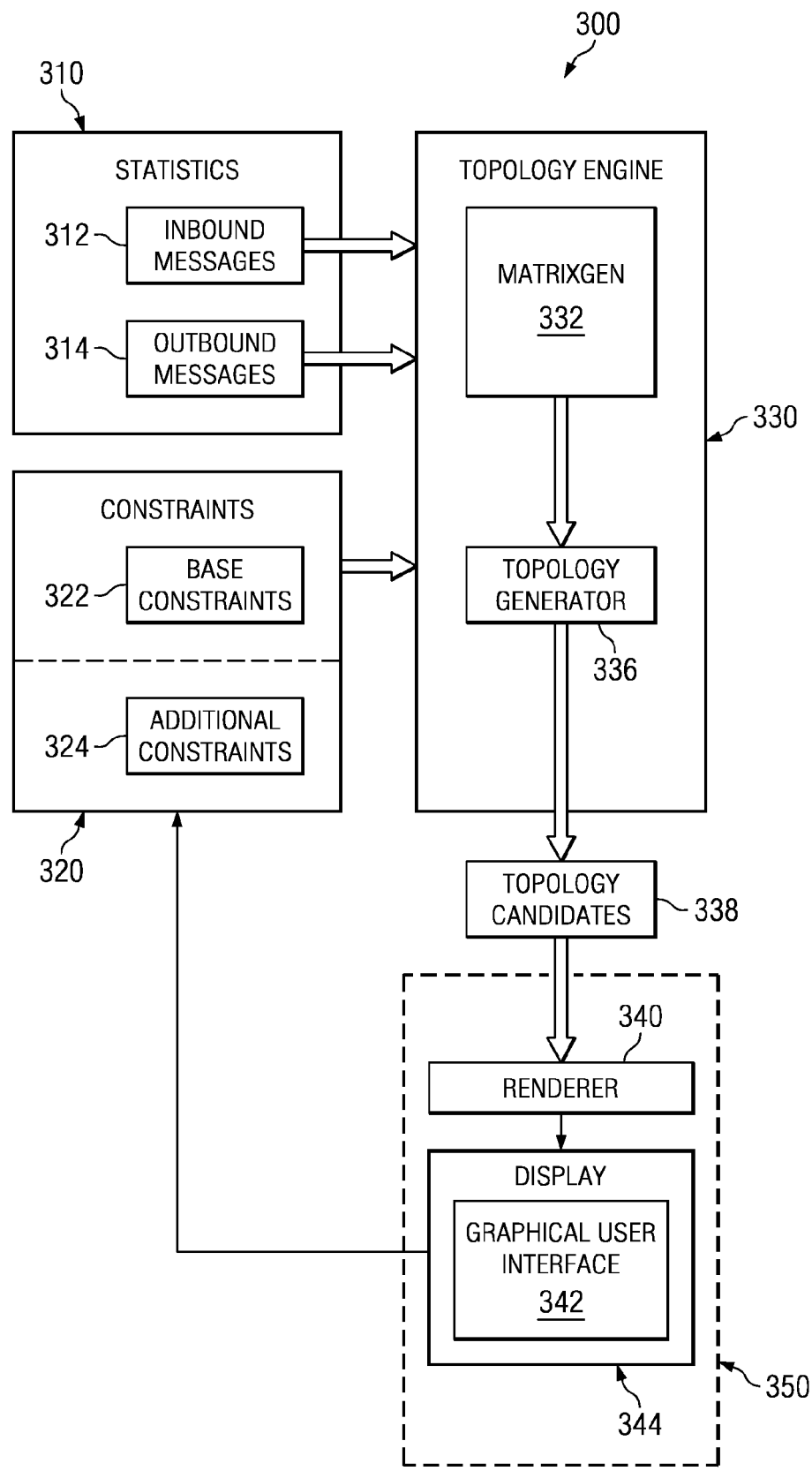
FIG. 3 is a detailed view of the top level flow diagram depicted in FIG. 2 in accordance with one embodiment of the disclosure.

FIG. 3 provides a more detailed operational view in diagram 300 of the processing according to an embodiment of the disclosure. The processing includes information or statistics 310 that may be generated by components that participate in a transaction run on a network. The statistics may comprise a tally or count of the number of messages processed by each component in the network. Each component or node in a network may receive an incoming or inbound event or message for processing. The component or node may also forward or send an event or message that is outgoing or outbound to another component or node for processing. The number of inbound messages 312 and outbound messages 314 are tracked and tallied for each component that may be involved in the processing of a transaction. Other statistics that may be recorded may include time and clock skew.

The statistics 310 may be input to the topology engine 330 to be used as part of a mathematical algorithm that determines the specific interconnections or layout of the network components involved in the transaction. Topology engine 330 includes matrixgen 332 and topology generator 336. The mathematical processing may be performed by a matrixgen 332. Matrixgen 332 may use the statistics 310 to generate a mathematical matrix structure having a number of rows and an equal number of columns corresponding to the rows. In one embodiment, the number of components or nodes of the network involved in the transaction represent an upper numerical bound on the number of respective rows and columns of the matrix. For example, if the number of components involved in the transaction equals four, matrixgen 332 would generate a matrix structure having 4 rows and 4 columns or a 4×4 matrix.

Matrixgen 332 also receives constraints 320. Matrixgen 332 may use constraints 320 to define the structure or form that must be used by a matrix in representing a topology. Constraints 320 may comprise a base set of constraints 322 that represent a minimum set of constraints to operate matrixgen 332. Additional constraints 324 may also be input to matrixgen 332 to produce more accurate results. In some embodiments, the constraints may enable matrixgen 332 to generate a topology solution faster. The constraints may take the format of a mathematical expression or other mathematical form that can be processed by matrixgen 332. The additional constraints 324 may include, for example, time or a restriction (such as a specified range) on the values of the elements in the matrix. Matrixgen 332 may generate a matrix. The matrix generated by matrixgen 332 may be input to topology generator 336. Topology generator 336 may input the matrix and generate potential solutions or topology candidates 338 that represent all possible topologies of a network for a specific transaction based on the constraints. The topology candidates 338 may be output to a storage or file for processing at a later time.

In an alternative and optional embodiment illustrated in block 350, the topology candidates 338 may be input to a renderer 340; possible topologies represent topology candidates 338 that may be graphically displayed on a graphical user interface 342 through renderer 340. Renderer 340 may be a software application that inputs the topology candidates 338 generated by topology generator 336 and outputs corresponding graphical images representative of each of the topology candidates 338 to a graphical user interface 342 of display 344. The graphical format of the topology candidates 338 may be examined or reviewed for the accuracy of the layout of its components and the interrelationships between the components. It may be determined that the topology does not accurately represent the layout of the components in a particular transaction. In such cases, additional constraints 324, in a mathematical format, may be applied to the processes of the topology engine 330 to enable the generating of additional and more accurate topology candidates 338.

Figure 4A:
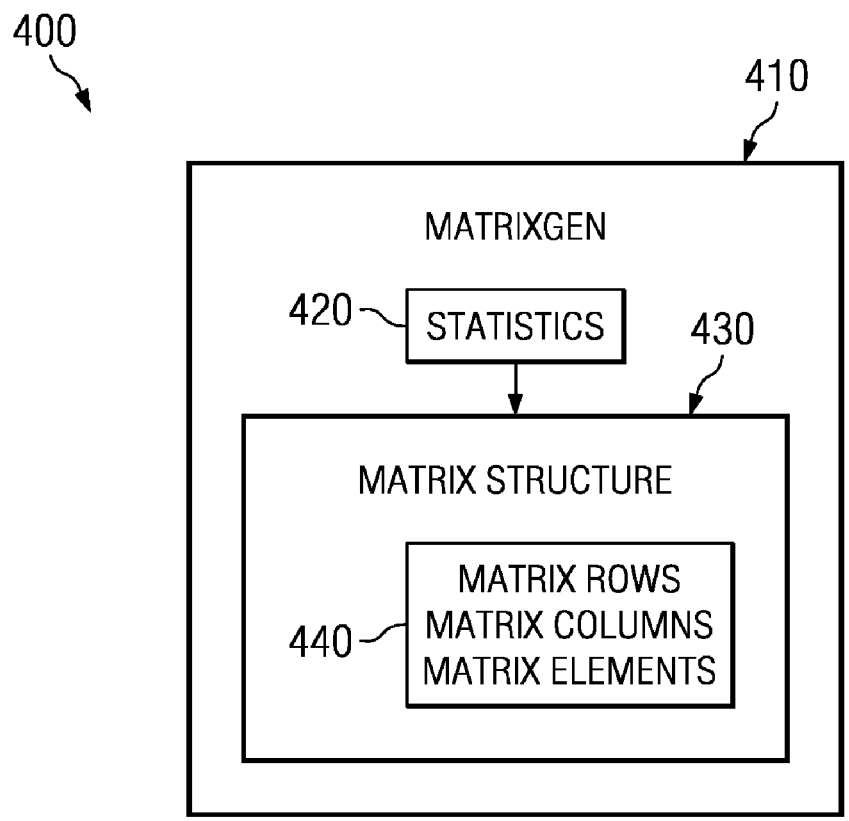
FIGS. 4A and 4B are detailed views of the components of topology engine in the top level flow block diagram depicted in FIG. 3 in accordance with one embodiment of the disclosure.

Turning now to FIG. 4A of diagram 400, matrixgen 410 includes statistics 420 that may comprise a number of the inbound messages and outbound messages counted or tallied for each node in a transaction. The statistics 420 may be processed to generate the variables for a matrix structure 430. The variables may represent the elements 440 of matrix structure 430. For example, the elements 440 of matrix structure 430 may include, without necessarily being limited to, matrix rows, matrix columns, and matrix entries.

Matrix structure 430 may represent a data structure of a tabular format suitable for processing by matrixgen 410. The data structure may be any kind of storage or retrieval structure. For example, in one embodiment, matrix structure 430 may be, but is in no way limited to, an array of multiple or n-dimensions, where n represents a positive integer. In other embodiments, matrix structure 430 may be a vector array. In another embodiment, matrix structure 430 may represent a relational database. In yet another embodiment, matrix structure 430 may be an indexed storage. Matrix structure 430 may also be considered to represent an adjacency matrix. Other embodiments may be possible as would be recognized by one skilled in the art.

Figure 4B:
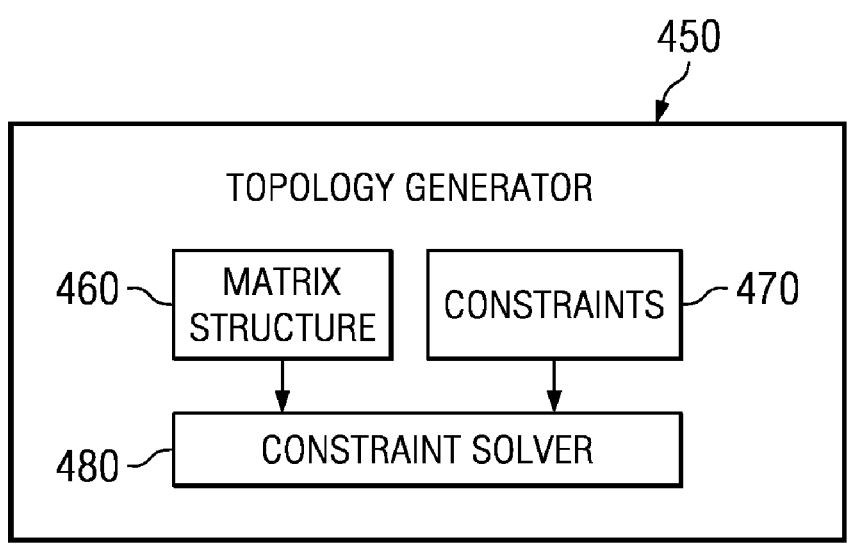

In FIG. 4B of diagram 400, topology generator 450 includes an input of a matrix structure 460 that may be generated by matrixgen 410 of FIG. 4A. Constraints 470 may be also be required as inputs to topology generator 450 in order to discover solutions to the matrix structure. The constraints 470 may be a basic set of constraints required for operation applied to matrix structure 460. Constraints 470 may provide a restriction on the values of the matrix structure 460. The number of constraints 470 may also provide a limit on the possible number of solutions that may be generated by constraint solver 480. For example, a particular transaction may produce a solution that generates one hundred topologies. One way to reduce the number of solutions generated may be to introduce an additional constraint, such as time or clock skew between components in a transaction. Constraint solver 480 may then be rerun to determine a number of topologies that may be reduced to a number that is less than one hundred topologies because of the additional constraint.

Topology generator 450 may input matrix structure 460 and constraints 470 to a constraint solver 480. Constraint solver 480 may generate one or more solutions for the matrix structure 460 depending on the constraints 470 applied to the matrix structure 460. It must be noted that each solution that may be generated by constraint solver 480 corresponds to a separate topology. Constraint solver 480 may produce solutions for matrix structure 460 using constraint programming techniques that may be recognized by one skilled in the art. In the constraint programming of the topology generator, a model or matrix structure 460 is established. Mathematical constraints including upper and lower bounds may be expressed and input to the constraint solver 480 to determine solutions to the matrix structure 460.

Figure 5:
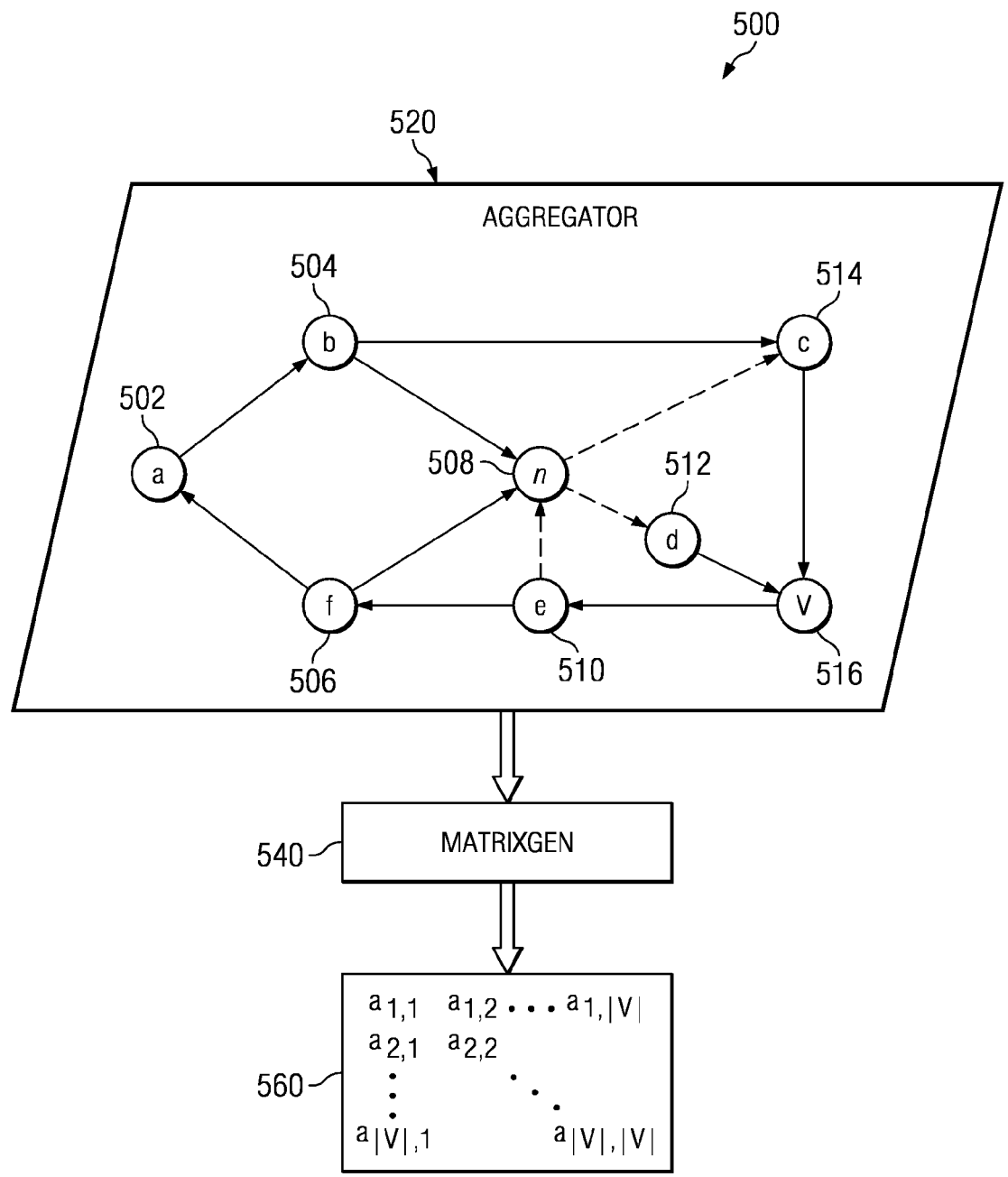
FIG. 5 illustrates a conceptual view of a portion of the topology engine according to one embodiment of the disclosure.

Turning now to FIG. 5, network 500 represents a generic layout that interconnects components that may be part of a transaction process according to an embodiment of the invention. The components of the network may be a system, a computer, a server, or some other processing entity or node. In network 400, the components include node a 502, b 504, f 506, n 508, e 510, d 512, c 514, and node V 516. It is important to note that network 500 is exemplary and is in no way indicative of an exact number of nodes that may exist in a network. In network 500, the letter n may represent any positive integer number that is zero or greater. The letter V may represent the total number of nodes that may be involved in a transaction executed in the network. In some embodiments, the number of components or nodes in a network may be transaction dependent. In other embodiments, the number of components or nodes may be system dependent. A transaction may be input to the network 500 for processing.

One such transaction may be, for example, a banking transaction that involves a transfer of funds from one bank account to another. It must be noted that the present disclosure should not be limited to banking transactions and may involve any number of different types of transactions that may occur within a network, as would readily suggest themselves to one skilled in the art. As the transaction executes, the participation of a number of components may be required. For example, inbound messages may be received for processing by a node. Nodes may process inbound messages and send outbound messages to other nodes. In this example, each message may relate to the transfer of funds. The number of inbound messages and outbound messages processed at each node may be tallied or counted. The tally may be performed by an aggregator 520. Aggregator 520 may represent a hardware or software component that captures the statistics of each node involved in a transaction. The statistics may include factors of time, direction of message, clock consideration and other variable constraints. The aggregator 520 may reside at each node to collect the statistics of each node or may be a node or other element of the network specifically dedicated for that purpose.

The statistics stored by the aggregator may be input to matrixgen 540. Matrixgen 540 may use the statistics collected by aggregator 520 to mathematically define and construct the structure of a matrix 560. Matrix 560 represents a generic matrix structure, also known as an adjacency matrix that accounts for the interactions of each node to every other node within the matrix 560. The various elements of the matrix 560, a, represents interactions between the row node and the column node. If there are V nodes that participated in the transaction, the matrix 560 will be of size V×V. Each row of the matrix 560 specifies the number of outbound messages of the node to the respective column node. Each column of the matrix 560 specifies the number of inbound messages of the node from the respective row node.

Figure 6:
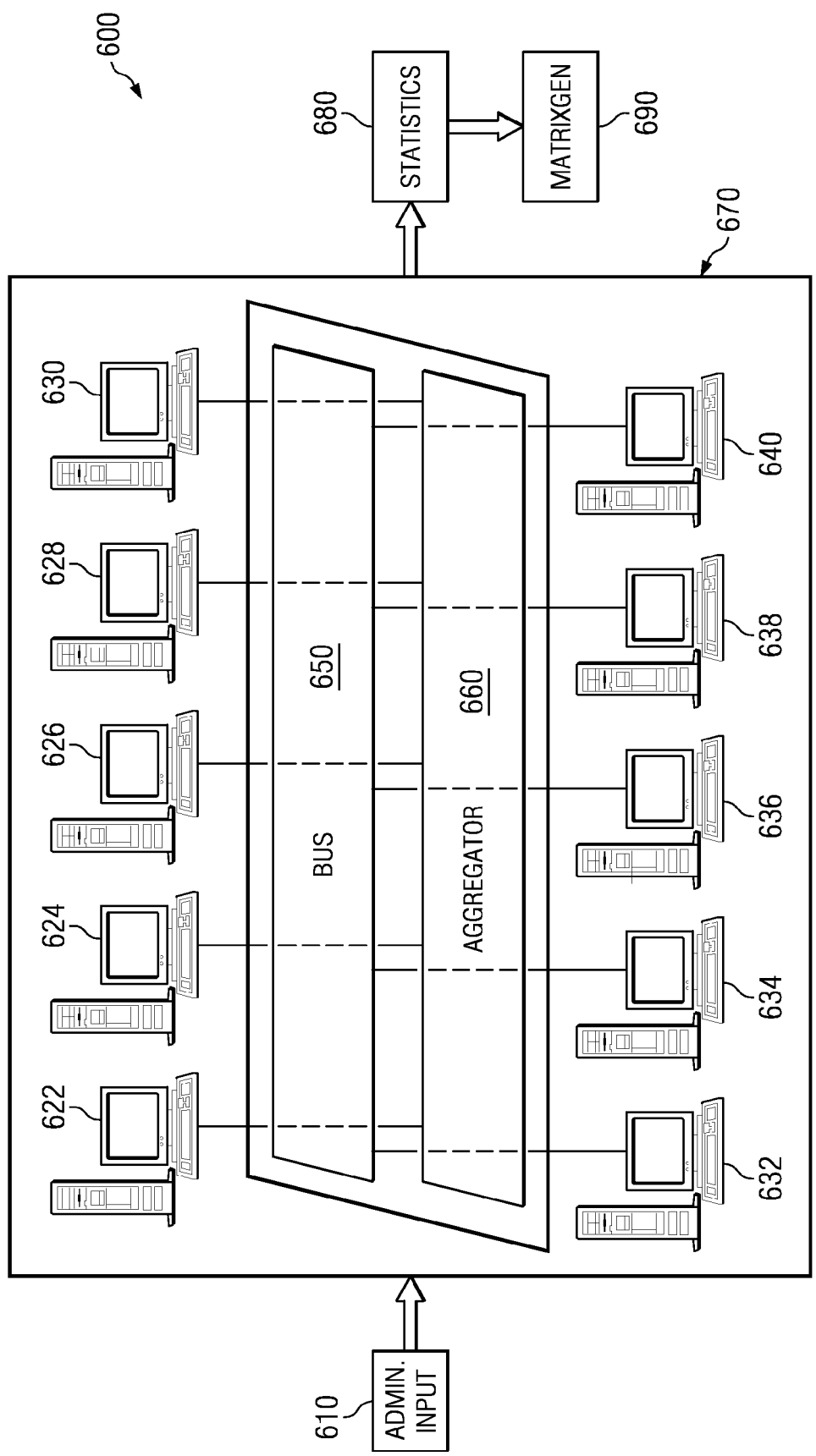
FIG. 6 illustrates another top level flow of the processing of a transaction in a network according to one embodiment of the disclosure.

In FIG. 6, diagram 600 represents a more detailed view of a possible network that processes a transaction. Using the banking transaction referenced in FIG. 5, an administrator 610 or other entity may input, for example, a request for network 670 to process a transfer of funds from one account to another. It must be noted that network 670 is not in any way limited to the representation depicted herein. Network 670 may comprise one or more networks. Examples of a network environment include, but are in no way limited to, one or more network types including types of wide area networks (WANs), local area network (LAN), wireless LAN (WLAN). In some embodiments, for example, the transaction may occur between elements within a single component.

The components of the network may be connected by a bus 650. Other types of connections may be possible. For example, a wireless, optical or other connection may be used as would be obvious to one skilled in the art. An aggregator 660 may tally, for each component, the number of inbound and outbound messages. The components may be a computer, server or other type of processing element as may be obvious to one skilled in the art. Network 670 includes components 622, 624, 626, 628, 630, 632, 634, 636, 638 and 640. However, any number of components may be used in a single transaction. Aggregator 660 outputs the statistics at statistics 680 for processing in matrixgen 690. The statistics may include time functions and other constraints that may be obvious to one skilled in the art.

Figure 7:
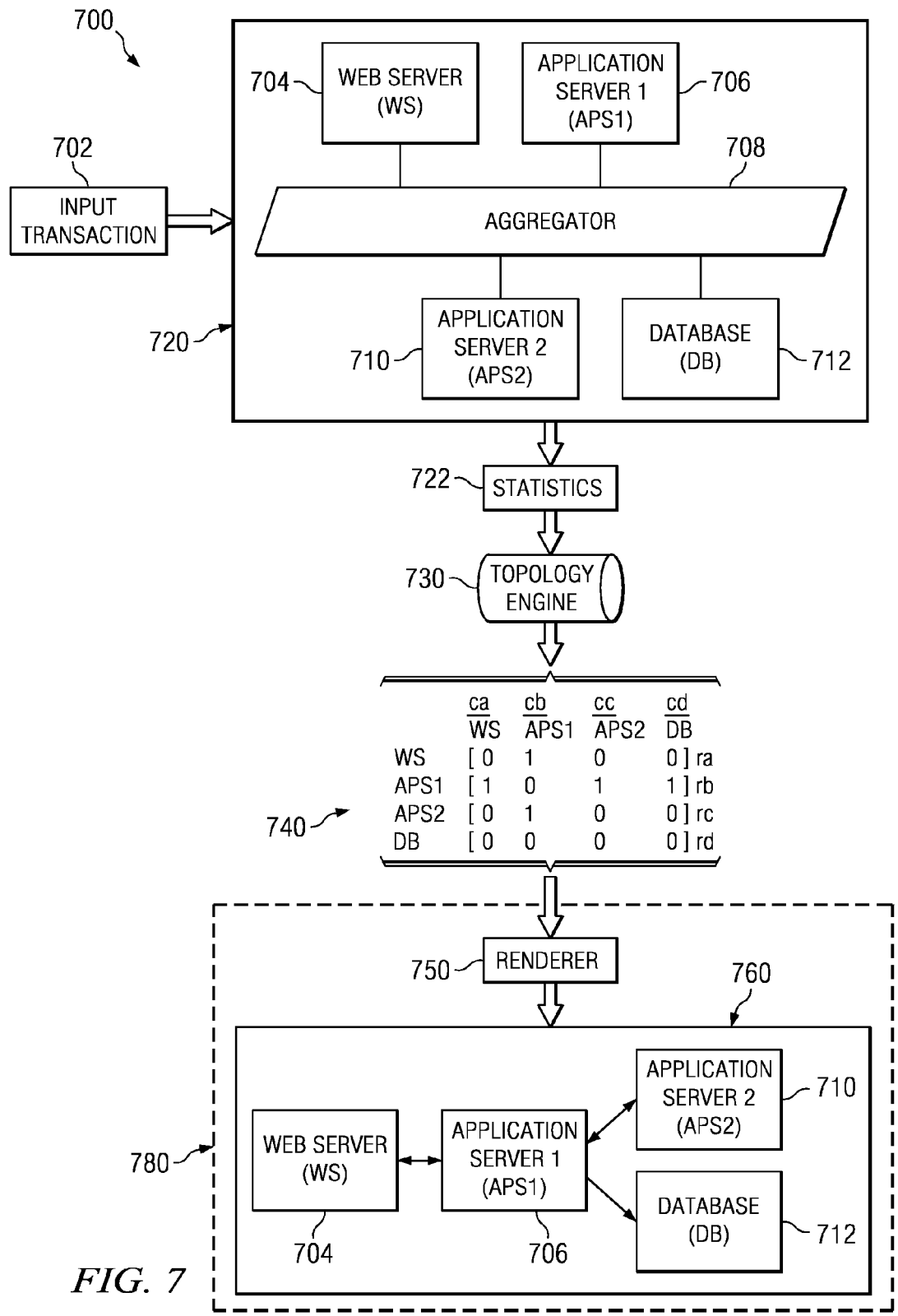
FIG. 7 is an operational view according to an embodiment of the disclosure.

FIG. 7 provides further operational details in diagram 700. Network 720 represents an exemplary network that includes the processing elements or nodes illustrated as web server (WS) 704, application server 1 (APS1) 706, application server 2 (APS2) 710, and a database (DB) 712. Network 720 is merely an exemplary network and the number of processing elements or components is not limited to the number illustrated therein. Network 720 also includes aggregator 708 that is operably connected to each of the nodes.

An input transaction 702 may be sent to network 720 for processing. A number of the nodes in network 720 may be involved in the processing of the transaction. However, the topology or interconnections of the nodes in the network is indeterminable. The aggregator 708 tracks and collects the inbound messages received or outgoing message sent between the nodes in network 720. In an embodiment, the aggregator 708 may also track and collect the time that each node in network 720 receives or sends out messages. The information collected by aggregator 708 represents statistics 722 that may be stored or collated for input to topology engine 730. The statistics 722 may be used by the topology engine 730 to provide the structure for matrix 740. Topology engine 730 also uses constraints to generate a number of matrices that represent possible topology candidates.

Topology engine 730 generates a number of possible solutions for the matrix output from matrixgen. Matrix 740 represents one solution generated by topology engine 730 based on the transaction network 720. Matrix 740 represents the input and output interconnections that may exist between each of the nodes. The rows of the matrix represent outbound connections. The columns of the matrix represent inbound connections. For example, row ra of matrix 740 Web Server (WS) has an entry of one under column cb. This indicates that Application Server 1 (APS1) has a connection to the Web Server (WS) and the connection is inbound to the APS1 from the WS. Similarly, row rb of matrix 740 features three entries that contains values of one. In row rb, the entry of one under column ca indicates that a connection to WS from APS1 exists. In row rb, the entry of one under column cc indicates that connection from Application Server 2 (APS2) to APS1 exists. Similarly, in row 2, row rb, the entry of one under column cd indicates that a connection to the database (DB) from APS1 exists. Row rc features a value of one under column APS1. This indicates an inbound connection from APS2 to APS1. Row rd has all zero entries which signify that no outbound connections exist between DB and any other component or node in network 720.

Turning now to the columns, column ca includes a value of one in row rb. This indicates an inbound connection to WS from APS1. Similarly, in column cb, the one in row ra and row rc represents the existence of inbound connections to APS1 from WS and APS2, respectively. In column cc, there is an outbound connection to APS2 from APS1 signified by the one value in row rb. Finally, in column cd, there is an inbound connection to the DB from APS1 as designated by the one value in row rb.

Matrix 740 represents a solution generated by topology engine 730. The solution may be output to a storage device. It may also be printed. In an optional embodiment 780, the solution may be transformed into a graphical representation through renderer 750. Renderer 750 may transform matrix 740 into a graphical image representation illustrated by topology 760. Topology 760 graphically displays all the nodes of network 720 and the precise input and output interconnections or relationships that may exist between each element or node of the network. For example, the matrix solution 740 indicated that there was one inbound connection to APS1 from WS and one outbound connection from APS1 to WS. Accordingly, topology 760 features a bidirectional connection between the WS node 704 and the APS1 node 706. Similarly, based on the matrix solution 740 that illustrates a zero in row rd, a zero in column cb, a one in column cd, and a one in row rb, there is only an outgoing connection that exists from APS1 706 to DB 712. Additionally the matrix solution illustrates that a bidirectional connection exists between APS1 706 and APS2 710.

Topology 760 may be graphically displayed on, for example, a graphical user interface of a display. The topology may also be refined for accuracy. In one embodiment, the refining may include additional constraints and solve for the matrices in the topology engine. In another embodiment, the positions of the network elements may be manually adjusted. For example, it could be that the position of Application Server 2 is manually swapped with the position of WS through a user interface to the display. This action by the user would create the constraint that the Application Server 2 is the first node in the topology.

Figure 8:
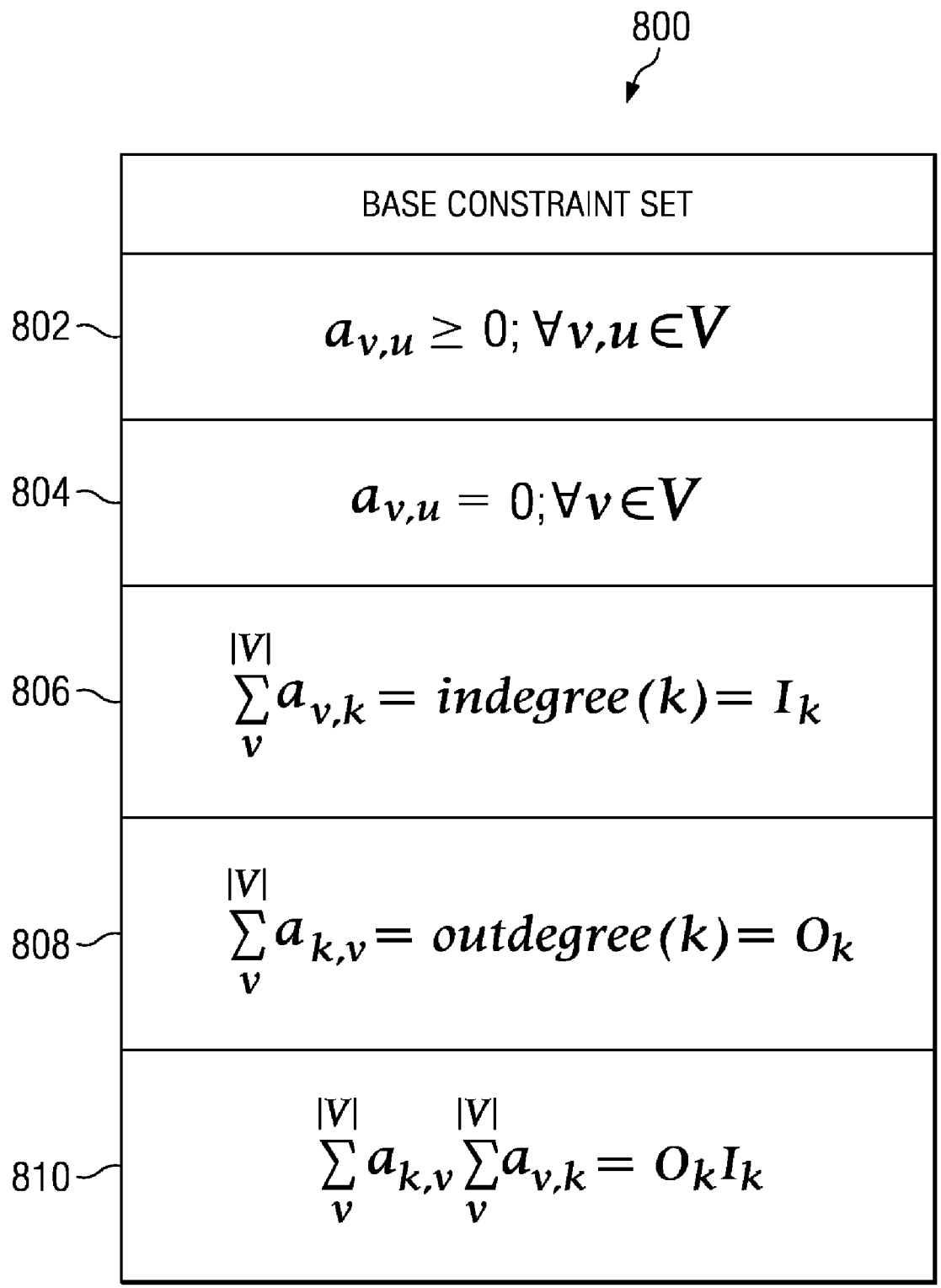
FIG. 8 illustrates the basic set of constraints used in a process according to one embodiment of the disclosure.

FIG. 8 illustrates a table 800 of basic constraints that may be a minimum set required for operation of the topology engine. The constraints provide mathematical restrictions on the values or statistics that are collected to form the structure of the matrix. Specifically, the constraints specify restrictions on the interconnections within topologies that are valid for each transaction that may be executed. The constraints may be applied to a number of entries that are within a matrix. Although it may be technically feasible for the topology engine to operate with less than the minimum set of constraints, it must be noted that fewer than the minimum number of constraints may likely result in an unreasonable number of possible topologies being generated. In Table 800, examples of the basic constraints for a matrix, such as in FIG. 5, are provided. Referring back to FIG. 5, matrix 560 represents one example of the matrix that may be configured through applying constraints in matrixgen 540. Throughout Table 800, the mathematical symbol $\alpha_{v,u}$ represents an element in a matrix at a particular row v and column u. The symbol V represents the set of nodes in the rows, and by definition of the matrix, the symbol V also represents the set of nodes in the columns. The constraints of Table 800, constraint 802-810, may be applied to a matrix, such as matrix 560 in conjunction with topology generator 1060 in FIG. 10 and a set of values for the matrix that satisfies all constraints simultaneously may be determined.

At 802, the constraint $\alpha_{v,u} \geq 0$; $\forall v, u \in V$ states that for every node u and every node v inside the set of V, element $\alpha_{v,u}$ must be greater than or equal to zero. This means that each element or node in a network must receive at least zero messages, or zero inbound and outbound events. Given constraint 802, the number of messages processed by each node in a network cannot be a negative value. Each node must have received an event in order for it to be represented in the topology. If the node does not receive any events, the node may be present in the matrix, but will not be represented in the topology.

Constraint 804 $\alpha_{v,u}=0$; $\forall v \in V$ states that for each element or node a $\alpha_{v,u}$ in the network, $\alpha_{v,u}$ is equal to zero. This means that a node in the network may not send inbound and outbound events or messages to itself. A transaction that involves message processing must be represented as occurring between individual nodes. If a node or component could send and receive messages to itself, the component would be represented as many distinct nodes, where the number of nodes is equal to the number of distinct messages the component sends to itself.

Constraint 806

$$\sum_{v}^{|V|} a_{v,k} = indegree(k) = I_k$$

states that the total number of inbound messages for node k is equal to the sum of the k-th column of the adjacency matrix. This may also be stated as: For the sum of all rows for node k (i.e., column k), the indegree of k is the same as the number of incoming messages for node k, (also written as $I_k$). One column of the matrix represents all incoming messages on a node. The sum of all rows in a network for node k (column k) is the indegree of node k, which is the number of incoming messages.

Constraint 808

$$\sum_{v}^{|V|} \alpha_{k,v} = outdegree(k) = O_k$$

states that the sum of all columns in a row k is equal to the total number of outbound events for the given node k. Stated alternatively, for the sum of all columns for node k (row k), the outdegree of k is the same as the number of outgoing messages (also written as $O_k$). One row of the matrix represents the outgoing messages for the node.

Constraint 810

$$\sum_{v}^{|V|} \alpha_{k,v} \sum_{v}^{|V|} a_{v,k} = O_k I_k$$

is used to ensure the order of rows and columns in a matrix are the same. It states that for a node k, the sum of the k-th row multiplied by the sum of the k-th column must equal the number of outgoing messages of node k ($O_k$) multiplied by the number of incoming messages for the same node k ($I_k$).

Other constraints may be used to further restrict the solutions generated by the topology generator. In an embodiment, a constraint may restrict the value of a matrix to the larger or maximum value of the number of inbound events or the number of outbound events. The restriction on the values that each entry in a matrix may have limits on the number of possible topologies that may be generated by the matrix. This constraint may be represented as $0 \leq \alpha_{i,j} \leq \max(I_j, O_i)$. Literally, this expression states that for each node in a network, the value must be greater than or equal to zero, and must be less than or equal to the maximum value of Inbound message events and Outbound message events for the node. A constraint may include a partial topology definition provided by the user or an existing transaction tracking technology.

In an embodiment, a constraint may include the time that each event occurred at a node. For example, an assumption regarding the clock skew between any two nodes may be made. If it is assumed that between any two nodes the clock skew threshold value is less than some threshold value t, a further constraint may be provided. The clock skew assumption may be used to limit the values of the entries in the matrix and limit the number of possible resulting topologies. To further describe the details of this constraint, the set of INBOUND events for a node v may be represented as $I_v = \{t_1, \ldots, t_k\}$ where each element corresponds to the time of a message or event. Similarly, the set of OUTBOUND events for a node v may be represented as $O_v = \{t_1, \ldots, t_m\}$. A clock skew limiting constraint may then be defined by finding the intersection between $I_i$ and $O_j$ whereby a constant difference exists between the elements. The size of the intersection may be a bound on a value in the adjacency matrix to limit the set of candidate topologies. The clock skew threshold may be used to increase or decrease the size of the intersection. The threshold should be an approximation on the actual time skew between each node. The time included with each event may be in Greenwich Mean Time if the machines are located in different time zones. The constraint may be written as $$0 \leq \alpha_{i,j} \leq \max_k(|I_j \cap \{O_i + k\}|).$$

Literally, this can be interpreted as a value in the adjacency matrix must range between 0 and the maximum number of temporally limited events within threshold t.

Referring now to FIG. 9, pseudocode 900 may be developed to implement features of the disclosed embodiments. The pseudocode comprises code sections or snippets that may be used to further develop a program in any programming language such a Java™, C++, Pascal, or any other programming language known to one skilled in the art. In pseudocode 900, code snippet 902 provides an explanation of the meaning of the variables used in the pseudocode. Code snippet 904 provides the parameters used in the pseudocode.

Inbound [k] is the same as indegree (k), I(k), in constraint 706 of FIG. 7, and represents the array of INBOUND events that have been tallied at a node k. Outbound [k] is the same as outdegree(k), O(k), in constraint 708 of FIG. 7, and represents the array of OUTBOUND events that have been tallied at node k and threshold is a limit on clock skew between any two nodes. Code snippet 906 and code snippet 908 of the pseudocode applies the base set of constraints referenced in FIG. 8, i.e. 802-810. For example, each occurrence of the variable C referenced in FIG. 9 contains all the constraints applied to that point in the code. The set of constraints may increase in size as the algorithm progresses. Although the base set of constraints are required, other constraints in addition to the base set of constraints are possible and may be applied to discover a topology for a particular transaction. For example, in the banking transaction used earlier in the disclosure, a first bank may process a transaction and include a specific constraint so that a first specific topology result may be included or excluded. A second bank may run the same transaction as the first bank and exclude the specific constraint included by the first bank or may include several other constraints so that a second topology different from the first topology may be included or excluded. Again, it must be noted that the banking transaction is exemplary and the disclosure may be applicable to any number of different types of transactions, remote or local, as may be known by one skilled in the art.

The constraints, C, may be parsed and added to the code one constraint at a time. Other constraints may be possible, depending on a particular application, transaction, or enterprise configuration. For example, code snippet 910 of the pseudocode provides constraints that may be based on time and time differentials. In section 910, the code may use the time information tallied with each of the INBOUND and OUTBOUND events or messages. If the time information is recorded, a constraint that limits the time change between any two nodes, during the period the time information is tallied, may be included. The time constraint may further reduce the number of possible topologies that may be found by the algorithm. The time constraint may also result in faster processing. Other advantages may be evident to one skilled in the art.

During the collection of statistics in a network, the Greenwich Mean Time (GMT) time between any two hosts or components of the network may be assumed to be within some constant threshold. The international time or Greenwich Mean Time (GMT) may be used to record the time to enable the time at each component or node within a network to be independent of the local time zone in which the component or node of the network may be located. For example, a set of INBOUND events at a node j and a set of OUTBOUND events at a node i are compared, where i and j represent any positive integer value. The largest number of events that have, at most, a constant threshold difference between every INBOUND and OUTBOUND for nodes j and i, respectively, is used as the upper bound on a value for the matrix at a location A(i,j), where A is a variable that represents an array such as an adjacency matrix or other tabular structure.

For example, if a node I sends several messages to a node J, the time difference between the OUTBOUND events from I and the corresponding INBOUND events to J may be assumed to be within a certain threshold value. Node I may receive inbound event at times 5, 10, and 15, that is INBOUND[I]={5, 10, 15}. Outbound events to J may occur at times 1, 6, and 11, that is, OUTBOUND [J]={1, 6, 11}. The number of events between node I and node j that have a constant difference between them may be calculated by taking the differences between the events. In this example, the best case is that node I and node J are 4 time units apart. The threshold may then be set to a value of 4. If the time difference that is stored along with the events is in the form 0+GMT, the use of this threshold may be reasonable as it may be assumed that as the number of inbound messages and outbound messages are being tallied for each node, the clocks that may be on each component are relatively constant.

Still referring to section 910, the code snippet illustrates that if timing information is not recorded, the upper bound on the value for the adjacency matrix A(i,j) is simply the maximum of the number of INBOUND events for node j and the number of OUTBOUND events for node i.

Code snippet 912 may apply a linear solver or Integer programming solver to the final set of constraints accumulated by constraint variable C. The linear solver may be an integer programming solver or other constraint programming tool. The solutions returned by the linear solver may produce one or more matrix structures representing possible topologies.

Figure 10:
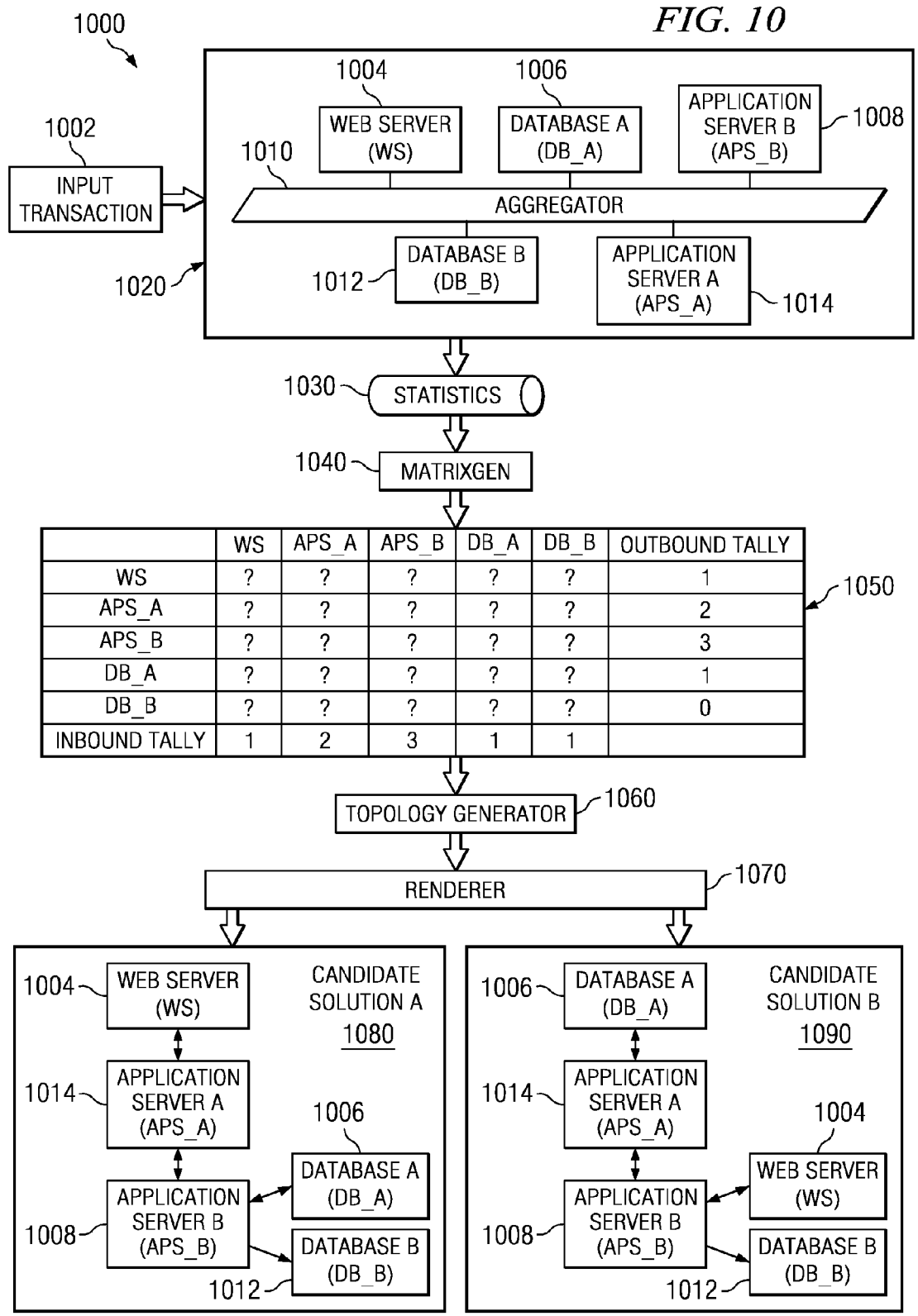
FIG. 10 is an extended operational view according to one embodiment of the disclosure.

FIG. 10 illustrates an operational view according to an embodiment of the disclosure. In FIG. 10, input transaction 1002 is run on network 1020. Network 1020 represents an exemplary network that includes the processing elements or nodes illustrated as web server (WS) 1004, application server A (APS_A) 1014, application server B (APS_B) 1008, database A (DB_A) 1006, and database B (DB_B) 1012. Network 1020 is merely an exemplary network and the number of processing elements or components is not limited to the number illustrated therein. Network 1020 also includes aggregator 1010 that is operably connected to each of the processing nodes.

One or more of the nodes in network 1020 may be involved in the processing of the transaction. However, the topology or interconnections of the nodes in the network 1020 is indeterminable. The aggregator 1010 tracks and collects the inbound messages received or outgoing messages sent between the nodes in network 1020. In an embodiment, the aggregator 1010 may also track and collect the time that each node in network 1020 receives or sends out messages. The information collected by aggregator 1010 represents statistics such as statistics 1030 that may be stored or collated at a central point or at each node.

The statistics, or statistics 1030, are used by matrixgen 1040 in a topology engine (not shown) to generate the structure of a matrix. For example, matrix 1050 represents one matrix structure that may be generated by matrixgen 1040 based on the exemplary network statistics 1030 stored for network 1020. The number of rows and number of columns of matrix 1050 is structured to correspond to the number of network nodes that participate in the transaction processing. For example, there are five nodes that are involved in the transaction processing. Therefore, there are five columns and five rows for the matrix. The statistics 1030 provide the number of inbound and outbound messages or events that are processed by each component or node of the matrix. All other matrix values are unknown. A topology generator 1060 in the topology engine (not shown) may solve a mathematical equation using constraints that are input to the topology engine. One or more solutions may be generated and configured into a matrix structure. Each matrix solution may describe a topology candidate or layout. For example, there may be two matrix solutions generated for matrix 1050 by topology generator 1060. The solutions may be input to renderer 1070.

Renderer 1070 may include an option to display the solution in a matrix format, such as is illustrated in FIGS. 11A and 11B, or a graphical format that illustrates the connections between the components. For example, the solutions to matrix 1050 may be graphically displayed as candidate solution A 1080 and candidate solution B 1090. Candidate solution A 1080 illustrates the potential interconnections and path of input transaction 1002. In candidate solution A 1080, the incoming flow of the transaction path may be from web server 1004 to application server A 1014, to application server B 1008, to database A 1006, then back to database B 1012. There is no path or flow from database B 1012 to application server B 1008. The transaction flow may also continue from application server B 1008 to application server A 1014 to web server 1004.

Candidate solution B 1090 differs from candidate solution A 1080 and features a reversal of the positions of the web server 1004 and the database A 1006. In candidate solution B, component Database A 1006 is the first node in the topology instead of the component web server 1004. Candidate solution B 1090 may also be a valid candidate solution as is shown by the matrix table 1050 that illustrates the tally of inbounds and outbounds for web server 1004 and database A 1006 being equal.

The topologies or layouts represented by candidate solution A 1080 and candidate solution B 1090 may be stored, printed or displayed graphically. The topologies may also be further refined for accuracy. For example, additional constraints may be added so that the topology generator computes only one solution to one matrix instead of multiple solutions. The more constraints that are added to the topology generator 1060, the more likely it may be that the candidate solutions that are generated actually represent the physical transaction path. Further, the correct topology or candidate solution or solutions may be achieved more quickly.

It may also be possible to manually refine the candidate solution A 1080 and candidate solution B 1090 topologies. For example, in the example of FIG. 10 featured above, an additional constraint may be manually added to restrict web server 1004 to being the first node or component in the topology. This added constraint would eliminate the possibility of candidate solution B 1090 and restrict the solution to the topology of candidate solution A 1080 only.

Referring now to FIG. 11A, matrix 1110 represents a solution that may be generated by topology generator 1060 based on the input matrix 1050 of FIG. 10. Renderer 1070 may generate candidate solution A 1080 from matrix 1110. In FIG. 11B, matrix 1120 represents a solution that may be generated by topology generator 1060 in FIG. 10, based on the input matrix 1050. Matrix 1120 may be stored or optionally may be rendered to a display by renderer 1070 in FIG. 10 to visually display candidate solution B 1090. It must be noted that each solution generated by topology generator 1060 for a matrix may correspond to a separate topology.

Figure 12:
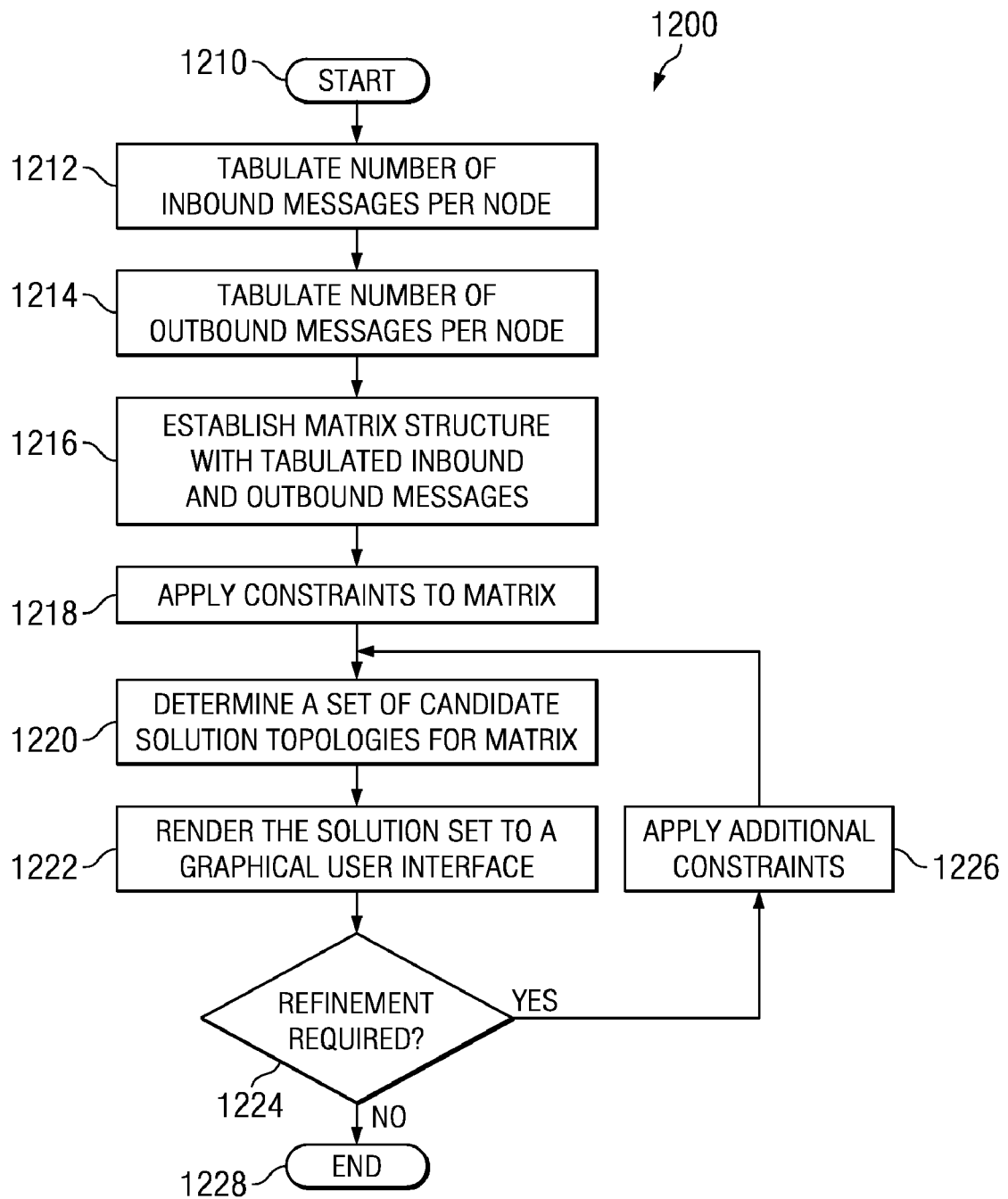
FIG. 12 is a flowchart that details the operations according to an embodiment of the disclosure.

In FIG. 12, flowchart 1200 details the process of the invention. The process may start 1210 when a transaction is processed by a network. The network may include a number of nodes or processing elements. The network may include components that are part of a local area network or within a wide area network. In some embodiments, the components may be connected through wired means. In other embodiments, the components may be communicatively coupled through wireless connections or a combination of wired and wireless connections.

The processing of a transaction may involve messages or events being processed by one or more nodes. At a block 1212, the number of inbound messages processed by each node may be tabulated for each node. The tabulation may occur at each respective node or at a central node. For example, there may be a hardware device or software component resident at each node or in a central node of the network that collects the information on number of messages processed. Similarly, at a block 1214, the number of outbound messages processed by each node may also be tabulated. The number of inbound and outbound messages provides no information on where the messages may be going within the network. For example, the source and or destination of each message processed by the node may not be determined or recorded. In some embodiments, time may be also tabulated. For example, in one embodiment, the arrival or inbound time of each message to a node may be tabulated. Also, a tabulation of the departure or outbound time of a message from each node may be tabulated and recorded. In other embodiments, the time it takes for a node to process an event may be tabulated.

The processing of the transaction completes and at a block 1216, a matrix structure is created with the tabulated inbound and outbound messages. Other information that may be tabulated may be included as part of additional constraints.

At a block 1218, constraints may be applied to the matrix in order to generate a solution. The constraints are used to control the generation of realistic transactional structures. For example, one constraint may be that a negative number may not exist in a matrix because it cannot be physically interpreted. Another constraint may be that each outbound or outgoing message may require a corresponding inbound or incoming message. A minimum set of constraints is used in order for operational purposes. The minimum set of constraints enables the operation of the process. Additional constraints may be added to refine the set of topological structures generated into a set more representative of the actual network.

At a block 1220, a set of one or more matrices may be determined as solution topologies. At a block 1222, the solutions may be rendered on a graphical user interface. The graphical user interface will graphically display the interconnections between the elements. Further refinement may be required to achieve a more representative solution. In some embodiments, the refinement may reduce the number of candidate solution topologies generated. In some embodiments, the refinement may increase the accuracy of the interconnections or topology. At a block 1224, further refinement may be required. In one embodiment, the system may require additional refinement. In another embodiment, a user may choose to add constraints to explore whether different sets of topologies are possible. The additional constraints may be applied at a block 1226 and another set of candidate solutions may be determined at a block 1220. If it is determined at a block 1224 that no further refinement of the solution set is required, the process may end at 1228.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of determining a topology of a transaction in a network, the method comprising:
    generating statistics of the transaction processed by the network, the network comprising a plurality of nodes, wherein generating comprises tabulating, at each node in the plurality of nodes of the network, a number of messages that are inbound to the node and a number of messages that are outbound from the node;
    determining a data structure that is mathematical, the mathematical data structure being created from the statistics generated in processing the transaction;
    applying a number of constraints to the determined mathematical data structure;
    calculating a solution for the mathematical data structure; and
    determining the topology based on the calculated solution.

2. The computer implemented method of claim 1, wherein determining the data structure includes generating a number of rows and a number of columns of the data structure, wherein the number of rows equals the number of columns.

3. The computer implemented method of claim 1, wherein the generating comprises:
    recording a time of processing of each message tabulated at each node in the network.

4. The computer implemented method of claim 1, wherein calculating the solution comprises enabling a constraint solver that generates solutions to the mathematical data structure.

5. The computer implemented method of claim 3, further comprising:
    refining the topology based on the recorded time.

6. The computer implemented method of claim 5, wherein the refining comprises:
    applying an additional constraint to the determined mathematical data structure; and
    generating another representation of the topology of the transaction.

7. A computer program product comprising:
    a computer recordable non-transitory medium tangibly embodying executable program code in a memory, the computer program product comprising:
        computer executable program code for generating statistics of a transaction processed by a network, the network comprising a plurality of nodes, wherein the computer executable program code generating statistics of the transaction comprises computer executable program code tabulating, at each node in the plurality of nodes of the network, a number of messages that are inbound to the node and a number of messages that are outbound from the node;
        computer executable program code for determining a data structure that is mathematical, the mathematical data structure being created from the statistics generated in processing the transaction;
        computer executable program code for applying a number of constraints to the determined mathematical data structure;
        computer executable program code for calculating a solution for the mathematical data structure; and
        computer executable program code for determining a topology based on the calculated solution.

8. The computer program product of claim 7, wherein computer executable program code for determining the data structure includes computer executable program code for generating a number of rows and a number of columns of the data structure, wherein the number of rows equals the number of columns.

9. The computer program product of claim 7, wherein the computer executable program code for generating statistics of the transaction comprises:
    computer executable program code for recording a time of processing of each message by each node in the network.

10. The computer program product of claim 7, wherein computer executable program code for calculating the solution comprises computer executable program code for enabling a constraint solver that generates the solution to the mathematical data structure.

11. The computer program product of claim 7 further comprising:
    computer executable program code for refining the topology.

12. The computer program product of claim 7, wherein the computer executable program code for tabulating comprises:
    computer executable program code for recording a time of processing of each event by each node in the network.

13. An apparatus that discovers a topology for a transaction, the apparatus comprising:
    means for generating a data structure that is mathematical with statistics tallied from processing the transaction through a network, wherein the statistics comprises a number of messages that are inbound and outbound from each node;
    means for applying a number of constraints to the generated mathematical data structure;
    means for calculating a solution for the mathematical data structure using the constraints and the tallied statistics; and
    means for determining the topology based on the calculated solution.

14. The apparatus of claim 13, wherein the data structure is an adjacency matrix.

15. The apparatus of claim 13, wherein the mathematical data structure is a relational database.

16. The apparatus of claim 13, further comprising means for rendering the determined topology.

17. The apparatus of claim 13, further comprising means for refining the determined topology.

* * * * *